T. G. GRIGGS.
POULTRY PICKER.
APPLICATION FILED NOV. 14, 1908.

920,566.

Patented May 4, 1909.
2 SHEETS—SHEET 1.

WITNESSES
Edw. Thorpe.

INVENTOR
Theodore G. Griggs
BY Munn & Co.
ATTORNEYS

T. G. GRIGGS.
POULTRY PICKER.
APPLICATION FILED NOV. 14, 1908.
920,566.
Patented May 4, 1909.
2 SHEETS—SHEET 2.
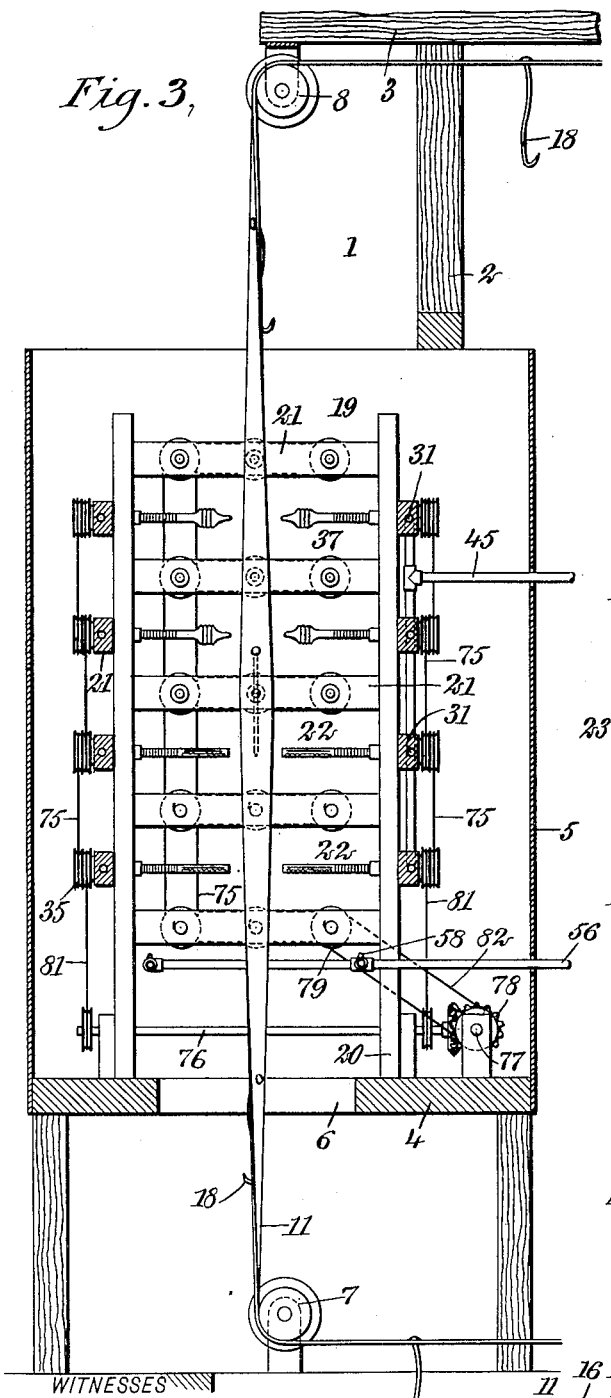
INVENTOR
Theodore G. Griggs
BY Munn & Co.
ATTORNEYS
WITNESSES
Edward Thorpe

UNITED STATES PATENT OFFICE.

THEODORE GILMAN GRIGGS, OF EAST ORANGE, NEW JERSEY.

POULTRY-PICKER.

No. 920,566.　　　　Specification of Letters Patent.　　　　Patented May 4, 1909.

Application filed November 14, 1908. Serial No. 462,578.

*To all whom it may concern:*

Be it known that I, THEODORE G. GRIGGS, a citizen of the United States, and a resident of East Orange, in the county of Essex and State of New Jersey, have invented a new and Improved Poultry-Picker, of which the following is a full, clear, and exact description.

This invention relates to poultry pickers, and the object of the invention is to produce a device of this class which will operate effectively to remove the feathers from fowls.

The invention contemplates the use of a plurality of pickers which engage the feathers of the fowls as they are moved past the pickers by the mechanism of the device, and these pickers are controlled in part by pneumatic means.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
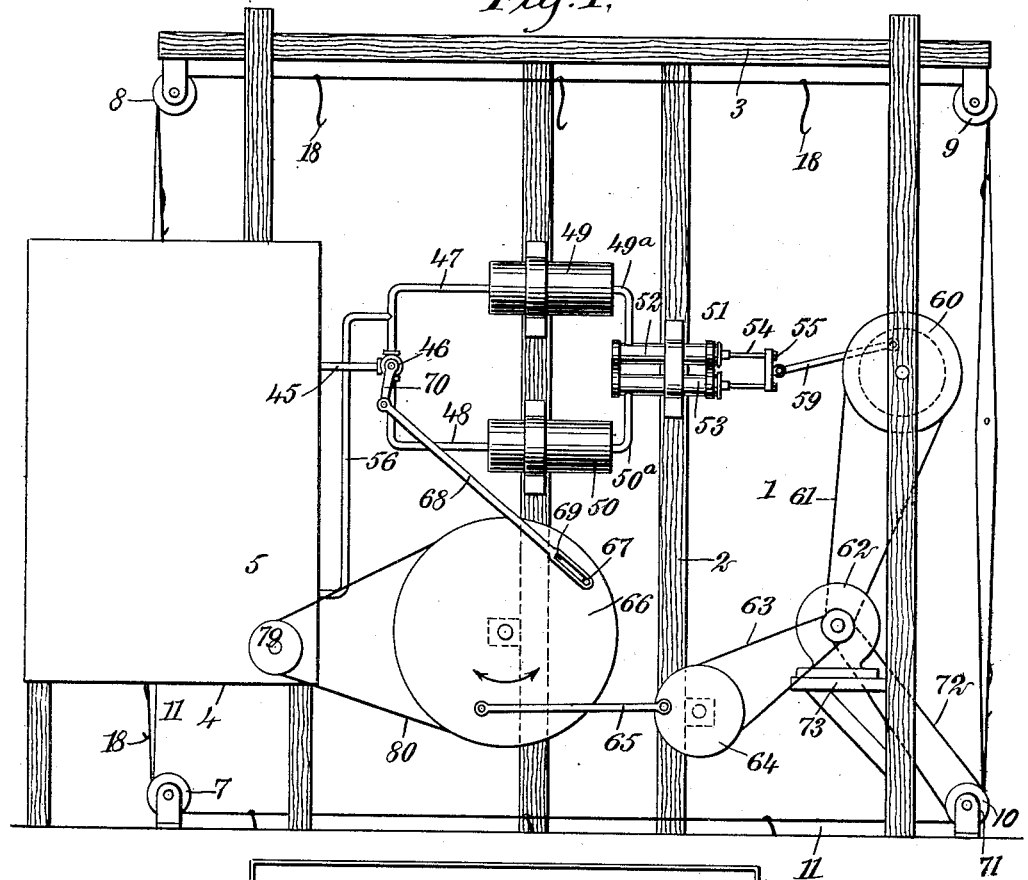
Figure 2:
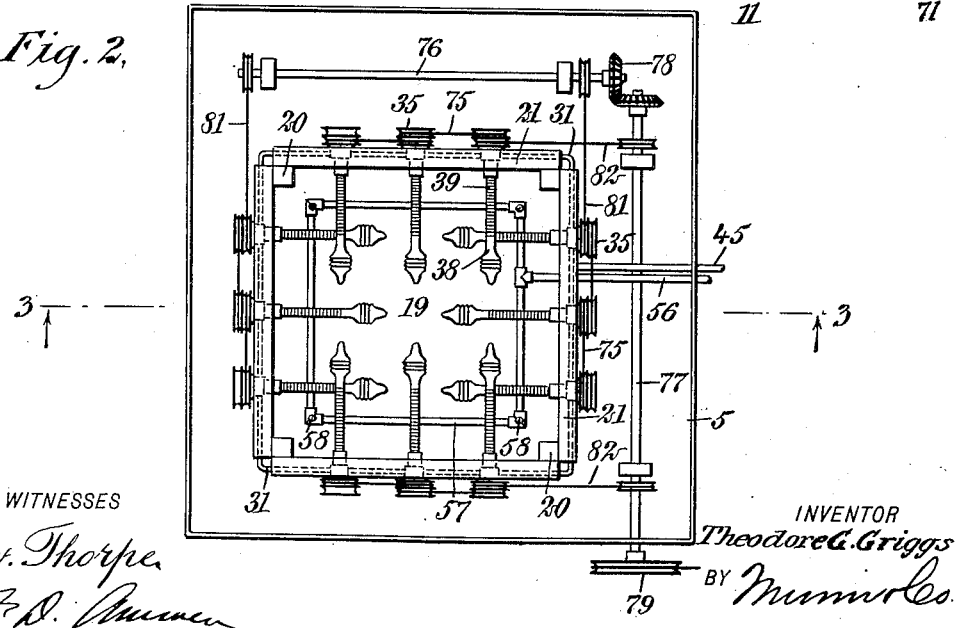

Figure 1 is a side elevation of a poultry picking apparatus constructed according to my invention; Fig. 2 is a plan of the picking device; Fig. 3 is a vertical section taken on the line 3—3 of Fig. 2 through the picking device; Fig. 4 is a longitudinal section taken at one of the pickers and illustrating the details of the construction for enabling the pickers to be pneumatically operated; Fig. 5 is a cross section through one of the primary pickers; Fig. 6 is a longitudinal section and partial elevation of the secondary pickers, showing the secondary pickers in an extended condition; Fig. 7 is a side elevation of one of the secondary pickers and showing it in a contracted condition; and Fig. 8 is a cross section taken through the conveyer belt and illustrating the means for guiding the same.

Referring more particularly to the parts, and especially to Figs. 1 to 3 inclusive, 1 represents the frame of the apparatus which comprises a plurality of standards or stanchions 2, said standards being arranged to support horizontal beams or girders 3, as shown. At one side of the frame a platform 4 is provided which constitutes a bottom for a case 5 of rectangular form, which seats over the bottom, as indicated in Fig. 3. This bottom 4 is provided with a central opening 6, and under this opening, a guide pulley 7 is provided. Directly over the case a similar guide pulley 8 is provided, and these guide pulleys 7 and 8 coöperate with other guide pulleys 9 and 10 so as to form a guide for an endless belt or conveyer 11. The form of these guide pulleys is clearly illustrated in Fig. 8. Each pulley is of double form presenting two sheaves 12 and 13 which are disposed slightly apart, presenting guide flanges 14 on their remote faces, said sheaves being supported from the outer side by the downwardly projecting arms 15 of yokes 16. In this way open spaces 17 are formed between the sheaves. The conveyer belt 11 is provided on its middle line, and at intervals along the length thereof, with hooks 18, and these hooks are adapted to pass into the spaces 17 when they are passing the pulleys, as indicated in Fig. 8.

Within the picker case 5 I provide a picker frame 19 which frame is of square form, as indicated in Fig. 2. The frame is formed of vertical corner posts 20, to which horizontal cross bars 21 are attached, the cross bars on one pair of opposite sides being arranged intermediately of the cross bars on the other opposite pair of sides. In the lower portion of this picker frame, a plurality of primary pickers 22 are provided. The construction of these pickers is clearly shown in Fig. 4. Each picker presents a tubular picker head 23 provided with a longitudinal slit 24 extending through the wall thereof, and adjacent this slit 24, a comb 25 is provided, which extends longitudinally of the slit, and this comb has teeth which project toward the slit and substantially tangentially of the tube, as indicated in Fig. 5. This tubular picker head 23 is connected by means of a flexible inner tube 26 with a tubular spindle 27 which is rotatably mounted in one of the cross bars 21. In addition to this flexible tube 26 which connects these parts, I also provide a helical coil 28 of resilient wire, which is wrapped around the inner end of the tube 23 and is attached to the end of the spindle 27, as shown. By this arrangement it should be understood that the picker head 23 normally tends to hold itself in the position shown in Fig. 4, but it may be pushed to one side by the body of the fowl, and it will still rotate when the body of the spindle rotates, being driven through the coil 28 which constitutes a flexible shaft for driving the picker head. The spindle 27 is mounted to rotate in a bushing or sleeve 29, which sleeve is enlarged at one end so as to form an air head having an annular air chamber 30, into which air may be admitted through a pipe 31. At the air chamber 30, the tube 26 is provided with openings 32 which effect communication between the air chamber and the interior of the spindle, as will be readily understood. The sleeve 29 projects on the inner side of the cross bar, and is provided with a stuffing box nut 33, and is also provided with a suitable packing 34. The outer end of the spindle 27 is enlarged so as to form a pulley or sheave 35, and the sleeve at this point is formed with a seat for a packing ring 36 which is adapted to pack the outer end of the sleeve, as will be readily understood.

The pickers 22 are mounted only in the lower part of the picker frame. In addition to the pickers of this type, I provide secondary pickers 37 in the upper part of the frame. The manner of mounting these pickers 37 in the frame is identical with that just described, but the form of the picker head is different, as illustrated in Figs. 6 and 7. The picker head is formed of a flexible tube 38 of rubber, light leather, or similar material, and this tubular head 38 is driven by a flexible shaft 39, consisting of a coiled wire, as indicated. The tubular head 38 is of constricted diameter and enlarged diameter in an alternate manner, so that when extended as represented in Fig. 6, it presents a plurality of hips 40 and waists 41 therebetween. At the hips 40, inner rings 42 are provided, which maintain a fixed diameter for the hips. At the waists 41, outer rings 43 are provided of smaller diameter which maintain a fixed diameter at this point. The outer end of the tubular head 38 is closed, and is formed into an integral bill or tip 44. With this construction it should be understood that when air pressure is developed within the tubular head 38, the tube will elongate or extend itself, as indicated in Fig. 6, but when a vacuum or partial vacuum is developed on the interior, the tube will contact in length so as to present the form shown in Fig. 7.

I provide means for alternately producing a pressure and partial vacuum in the picker heads. In this connection it should be understood that the pickers 37 are mounted on the spindles 27 aforesaid in the same manner as the primary pickers, and the pipes 31 which connect with the spindles 27 are connected by a main pipe 45, which pipe leads to a valve 46. From this valve 46, branch pipes 47 and 48 lead. The branch 47 connects with an air reservoir 49, while the pipe 48 connects with a suction cylinder 50. This reservoir and suction cylinder are of similar construction, and are mounted on the frame, as shown. Adjacent to them, I provide a pump 51 having an air compressing cylinder 52 and a suction cylinder 53, said cylinders being provided with pistons 54, to which a cross head 55 is attached, as shown. From the branch pipe 47, a blower pipe 56 extends downwardly. This blower pipe is attached in the lower part of the case to a blower frame 57 of square form, as indicated in Fig. 2. This blower frame is formed with elbows at the corners thereof, and these elbows are provided with blower nozzles 58, as indicated. The cross head 55 is connected by a pitman 59 with a crank disk 60, and this crank disk is rotated continuously by a belt 61 driven from a motor 62 of any suitable form. This motor 62 also drives a crank disk 64 through a belt 63, and this crank disk is connected by a pitman 65 to a rocker or rocker wheel 66. This rocker wheel is provided with a pin 67 which is connected with a link 68 by means of a slot 69 formed longitudinally in the end of the link, as shown. The other end of the link 68 is connected to the lever 70 of the aforesaid valve 46.

The shaft of the guide pulley 10 is provided with a belt pulley 71, and this belt pulley 71 is driven by a belt 72 from the motor 62, as shown, the said motor being mounted upon a suitable bracket 73 attached to the frame, as indicated.

I provide means for rotating the picker spindles first in one direction and then in the other, that is, they rotate forwardly and then they reverse. For this purpose each of the aforesaid pulleys 35 are provided with two belt grooves 74, and these enable the pulleys all to be connected by small rope belts or cords 75, as indicated in Fig. 2. In the lower part of the case 5, picker shafts 76 and 77 are provided, which are disposed at right angles to each other and connected together by bevel gears 78, as shown. The shaft 77 is extended through the side of the case and is provided with a pulley 79, by means of which it may be driven from the rocker wheel 66 by means of a suitable belt or cord 80. These shafts 76 and 77 are connected with the pulleys on opposite sides of the picker frame by means of belts 81 and 82 respectively, as shown in Figs. 2 and 3. In view of the fact that the wheel 66 does not rotate continuously in one direction, it will be understood that its motion will operate to rotate the picker first in one direction and then in the other.

On account of the slot 69 and the pin 67, it will be understood that the valve lever 70 will be moved into one position and allowed to remain there for a portion of the time, and it will then be moved to another position in which it will rest the remainder of the time. In one of these positions communication is opened from the branch pipe 47 to the main pipe 45; in the other position of the valve lever communication is opened from the pipe 48 to the main pipe 45.

The mode of operation of the picker will now be described: The bodies of the fowls are hung upon hooks 18 and pass upwardly through the picker case 5. The picker heads all project inwardly into the space surrounded by the picker frame, and from this space the conveyer belt carries the fowls, as will be readily understood. As the fowls come in contact with the pickers 22, the feathers are caught by the combs 25 on the rotating heads, and these combs grasp the feathers and wrap them around the picker heads 23 when the pickers are rotating in a forward direction. At this time the valve 46 is in a position to open communication with the suction cylinder 50, which cylinder is connected with the cylinder 53 by a suitable pipe 50ª. At this time also a partial vacuum is developed in the picker heads so there is a new draft or air current through the slit 24, which tends to draw the feathers onto the heads. After rotating in a forward direction for a short time, the pickers reverse their direction of rotation. At all times the pickers are driven through the flexible shaft connections so that they adapt themselves to any position the body of the fowl may be in. As the fowls pass the primary pickers, they come into contact with the secondary pickers 37. As these pickers extend themselves under the air pressure which is developed in the picker heads 38 when the valve 46 is open to the air reservoir 49, the feathers will come against the waists 41 of the pickers between the hips, and then as the partial vacuum comes on the hips, the hips catch the feathers between them, as will be readily understood. In this way the feathers are caught and rolled up under the advancing motion of the picker heads. After reversal takes place, the pressure comes on again and the feathers are released from the extended hips, as will be readily understood. The feathers which are removed from the fowls will be constantly removed by the nozzles 58 which will blow the feathers out through the upper part of the case.

It should be understood that as the cross head 55 is constantly reciprocated, it will always maintain a pressure in the reservoir 49 through the medium of a pipe 49ª which connects it with the air cylinder 52. Attention is called to the fact that the pipe 56 is constantly connected with the pipe 47, so that air is constantly blown through the nozzles 58.

On account of the endless belt conveyer which I use for feeding the fowls to the pickers, it will be evident that the fowls may pass and repass the pickers as often as desired.

It should be understood also that the primary pickers 22 are especially useful for removing the heavier outer feathers from the bodies of the fowls, whereas the secondary pickers are especially adapted for removing the inner or lighter feathers.

Having thus described my invention, I claim as new and desire to secure by Letters Patent,—

1. In a device of the class described, a picker head of tubular form having a comb on the side thereof adapted to engage the feathers of the fowls, means for rotating said picker head, said picker head having an opening therein, and means for producing a partial vacuum on the interior of said head to draw the feathers into the path of said comb.

2. In a device of the class described, a picker head of tubular form, having a comb on the side thereof adapted to engage the feathers of the fowls, means for rotating said picker head, said head having a slit through the wall thereof, and means for alternately producing a partial vacuum and air pressure on the interior of said picker head.

3. In a device of the class described, a picker head having a comb on the side thereof for engaging the feathers, pneumatic means for drawing the feathers into the path of the said comb, a flexible shaft attached to said head, and means for rotating said picker head on its longitudinal axis through said flexible shaft.

4. In a device of the class described, in combination, a picker frame, a tubular spindle rotatably mounted thereon, a tubular picker head, a flexible shaft connecting said tubular picker head with said spindle and pneumatic means in connection with said tubular spindle coöperating with said flexible shaft to control the operation of said picker head.

5. In a device of the class described, in combination, a picker frame, a sleeve mounted in said frame having an air chamber, a supply pipe connecting with said air chamber, a tubular spindle having openings connecting with said air chamber, and a picker head carried by said spindle.

6. In a device of the class described, in combination, a picker frame, a sleeve mounted in said frame, having an air chamber, a tube connected with said air chamber for conducting air to or from the same, a tubular spindle rotatably mounted within said sleeve and having openings communicating with said air chamber, a flexible shaft attached to said spindle, and a picker head actuated by said flexible shaft.

7. In a device of the class described, in combination, a picker head consisting of a tube of flexible material having enlarged hips and contracted waists between said hips, and means for alternately producing pressure and partial vacuum within said picker head, to alternately contract and expand said head.

8. In a device of the class described, in combination, a picker head consisting of a tube of flexible material having enlarged hips and contracted waists between said hips, means for alternately producing pressure and partial vacuum within said picker head to alternately contract and expand said head, and means for rotating said picker head.

9. In a device of the class described, in combination, a case, means carried thereby for picking feathers from the fowls, a conveyer belt, sheaves guiding said belt and disposed in separated pairs, and hooks carried by said belt near the middle line thereof adapted to receive the fowls and passing between said sheaves, and means for guiding said belt through said case.

10. In a device of the class described, in combination, a case, a plurality of tubular picker heads mounted therein, a pipe connecting with said picker heads, a two-way valve connected with said pipe, an air reservoir, a vacuum cylinder, a branch pipe connecting said reservoir with said valve, a branch pipe connecting said vacuum cylinder with said valve, means for rotating said pickers, and means holding said valve in one position in which communication is opened through said first branch pipe to said first pipe and in the second position in which communication is opened from said second branch pipe to said first pipe, whereby alternately a pressure and a partial vacuum is developed under said tubular picker heads.

11. In a device of the class described, in combination, a case, a plurality of tubular picker heads rotatably mounted therein, a rocker wheel, a pipe connected with said tubular picker heads, a two-way valve, branch pipes connecting said valve to an air supply and to a partial vacuum respectively, a link connecting said valve with said rocker wheel, means for rotating said pickers from said rocker wheel, and means for rocking said rocker wheel.

In testimony whereof I have signed my name to this specification in the presence of two subscribing witnesses.

THEODORE GILMAN GRIGGS.

Witnesses:
 ED. F. BRIGGS,
 SAMUEL A. NEVINS.